(12) United States Patent
Liu (10) Patent No.: US 8,262,070 B2
(45) Date of Patent: Sep. 11, 2012

(54) CLAMPING DEVICE WITH A LINKING MEMBER

(75) Inventor: Woody Liu, Taipei (TW)

(73) Assignee: Comart Corporation, Taipei (TW)

( * ) Notice: Subject to any disclaimer, the term of this patent is extended or adjusted under 35 U.S.C. 154(b) by 739 days.

(21) Appl. No.: 12/458,132

(22) Filed: Jul. 1, 2009

(65) Prior Publication Data

US 2010/0295228 A1 Nov. 25, 2010

(30) Foreign Application Priority Data

May 25, 2009 (TW) ................ 98209130 U (51) Int. Cl.
*B25B 5/00* (2006.01)
*B25B 1/20* (2006.01)
*B25B 1/22* (2006.01)
*B43L 5/02* (2006.01)
*H01L 21/687* (2006.01)
*B25B 5/06* (2006.01)

(52) U.S. Cl. .................. 269/254 R; 269/302.1; 269/43; 269/75

(58) Field of Classification Search .............. 269/289 R, 269/302.1, 43, 45, 71, 75; 375/455; 248/316
See application file for complete search history.

(56) References Cited

U.S. PATENT DOCUMENTS

| | | | |
|---|---|---|---|
| 6,785,958 B1 * | 9/2004 | Saito et al. ...................... 29/760 |
| 6,944,294 B2 * | 9/2005 | Tsay .............................. 379/446 |
| 7,647,676 B2 * | 1/2010 | Carnevali ........................ 24/523 |
| 2002/0159587 A1 * | 10/2002 | Chang ............................ 379/454 |
| 2002/0191782 A1 * | 12/2002 | Beger et al. ................... 379/454 |
| 2004/0091102 A1 * | 5/2004 | Tsay .............................. 379/441 |
| 2004/0254002 A1 * | 12/2004 | Tsay .......................... 455/575.9 |
| 2005/0288068 A1 * | 12/2005 | Tsay .......................... 455/569.2 |

* cited by examiner

*Primary Examiner* — Lee D Wilson
*Assistant Examiner* — Alvin Grant
(74) *Attorney, Agent, or Firm* — Rosenberg, Klein & Lee (57) ABSTRACT

A clamping device with a linking member, the linking member is pivotally connected with a first and a second slide member, the slide members can be extended outwards and contracted inwards; wherein when deviation angles of two guide slits of the linking member are sharp angles, the first and the second slide members are at their initiate positions, and when deviation angles of two guide slits are obtuse angles, the first and the second slide members are at their extending positions.

17 Claims, 11 Drawing Sheets

CLAMPING DEVICE WITH A LINKING MEMBER

BACKGROUND OF THE INVENTION

1. Field of the Invention

The present invention relates to a clamping device operated with a linking member, and especially to a clamping device with a linking member which is pivotally connected with a pair of slide members, thus the slide members can be extended outwards and contracted inwards.

2. Description of the Prior Art

A conventional technique which is a U.S. Pat. No. 5,903,645 titled "CLAMPING DEVICE FOR MOBILE PHONES" mainly has a fork shaped link integrally and pivotally connected at a center, the link has a left and a right end each pivotally connected with a clamp seat, the clamp seat is provided on its lateral side with slanting rack teeth, an elastic securing seat is disposed adjacent to the slanting rack teeth and has stop elements for projecting into the rack teeth; the clamp seat can only displace inwardly to be positioned in place; the securing seat has a slanting notch at its rear end, the slanting notch is provided therein with a press rod being passed through the notch itself, and is provided further with corresponding slanting notches; by pressing the press rod, the securing seat is urged to displace rearwardly, causing the stop elements to disengage from the rack teeth; due to the action of compression springs, the clamp seats are caused to instantly extend, so that any of various types of mobile phones can be clamped firm and released.

However, the structural features of the fork shaped link and the clamp seats will restrain the stroke of to and fro movement, i.e., the ranges that the clamp seats extend are restrained; and thereby when a user desires to clamping hold a wider instrument, it is wondered if such conventional clamping device is not suitable for use some times.

SUMMARY OF THE INVENTION

The primary object of the present invention is to provide a clamping device with a linking member, the linking member is pivotally connected with a first and a second slide member, the slide members can be extended outwards and contracted inwards; wherein when deviation angles of two guide slits of the linking member are sharp angles, the first and the second slide members are at their initiate positions, and when deviation angles of two guide slits are obtuse angles, the first and the second slide members are at their extending positions.

The effect of gain of the present invention is resided in getting rid of the restraining of the conventional clamping device in order to suit clamping other wider instruments, the present invention can slow down the speed of sliding of the first and the second slide members, and can make more stable of the second slide member during sliding to and fro.

Another effect of gain of the present invention is resided in that the linking member can be circular which is provided on and around its periphery with a set of positioning teeth, the positioning rack is provided to allow a positioning claw of an engaging member to engage therein for positioning, this can further simplify the structure of the clamping device.

In a first embodiment of the present invention, a clamping device with a linking member is provided, it comprises:

a base that is combined with a cover;

a linking member pivotally connected with the base and having two guide slits;

a first and a second slide member provided between the base and the cover, two positioning pins of the slide members are extended through the two guiding slits of the linking member, the slide members both have clamping arms;

a pair of main springs respectively provided between the base and their corresponding slide members;

an engaging member pivotally provided on the base, a positioning spring is provided to push a positioning claw of the engaging member to engage in a positioning rack of the first slide member;

a first gear pivotally provided on the base, and is engaged with the rack of the second slide member;

a push button provided on the base, and having a restoring spring; wherein when deviation angles of the two guide slits of the linking member are sharp angles, the first and the second slide members are at their initiate positions, then the main springs are each in a state of being compressed; and when the push button moves away the positioning claw of the engaging member from the positioning rack, the main springs push the first and the second slide members to slide outwards to their extending positions, and deviation angles of two guide slits become obtuse angles; when the first and the second slide members restore their original inside positions, the positioning spring pushes the positioning claw of the engaging member to engage in the positioning rack for positioning.

In a second embodiment of the present invention, a clamping device with a linking member is provided, it comprises:

a base that is combined with a cover;

a linking member pivotally connected with the base and having two guide slits;

a first and a second slide member provided between the base and the cover, two positioning pins of the slide members are extended through the two guiding slits of the linking member, the slide members both have clamping arms;

a pair of main springs respectively provided between the base and their corresponding slide members;

an engaging member pivotally provided on the base, a positioning spring is provided to push a positioning claw of the engaging member to engage in a positioning rack of the first slide member;

a push button provided on the base, and having a restoring spring; wherein when deviation angles of the two guide slits of the linking member are sharp angles, the first and the second slide members are at their initiate positions, then the main springs are each in a state of being compressed; and when the push button moves away the positioning claw of the engaging member from the positioning rack, the main springs push the first and the second slide members to slide outwards to their extending positions, and deviation angles of two guide slits become obtuse angles; when the first and the second slide members restore their original inside positions, the positioning spring pushes the positioning claw of the engaging member to engage in the positioning rack for positioning.

In a third embodiment of the present invention, a clamping device with a linking member is provided, it comprises:

a base that is combined with a cover;

a circular linking member pivotally connected with the base and having two guide slits, the circular linking member is provided on and around its periphery with a set of positioning teeth;

a first and a second slide member provided between the base and the cover, two positioning pins of the slide members are extended through the two guiding slits of the linking member, the slide members both have clamping arms;

a pair of main springs respectively provided between the base and their corresponding slide members;

an engaging member pivotally provided on the base, a positioning spring is provided to push a positioning claw of the engaging member to engage in a positioning rack of the first slide member;

a push button provided on the base, and having a restoring spring; wherein when deviation angles of the two guide slits of the linking member are sharp angles, the first and the second slide members are at their initiate positions, then the main springs are each in a state of being compressed; and when the push button moves away the positioning claw of the engaging member from the positioning rack, the main springs push the first and the second slide members to slide outwards to their extending positions, and deviation angles of two guide slits become obtuse angles; when the first and the second slide members restore their original inside positions, the positioning spring pushes the positioning claw of the engaging member to engage in the set of positioning teeth for positioning.

The present invention will be apparent in its features, technical measures, its particular functions achieved and objects after reading the detailed description of the preferred embodiment thereof in reference to the accompanying drawings.

DETAILED DESCRIPTION OF THE PREFERRED EMBODIMENT

Referring to FIGS. 1-5 showing a preferred embodiment of a clamp device of the present invention, the clamp device comprises a base 10, a cover 20, a linking member 30, a first slide member 40, a second slide member 50, a pair of main springs 61, 62, and a push button 70. The base 10 is combined with the cover 20; the linking member 30 is pivotally provided on a pivot 11 of the base 10, and has two guiding slits 31, 32; the first slide member 40 and the second slide member 50 are provided between the base 10 and the cover 20, a positioning pin 41 of the first slide member 40 is extended through the guiding slit 31 of the linking member 30, and the first slide member 40 has a clamping arm 42; a positioning pin 51 of the second slide member 50 is extended through the guiding slit 32 of the linking member 30, a front end 611 of the main spring 61 is slipped over a fixing portion 43 of the first slide member 40, a rear end 612 of the main spring 61 is abutted against a fixing portion 12 of the base 10; a front end 621 of the main spring 62 is slipped over a fixing portion 53 of the second slide member 50, while a rear end 622 of the main spring 62 is abutted against a spring fixing portion 13 of the base 10; an engaging member 71 and a rotative arm 72 are pivotally provided on the base 10, and a positioning spring 73 is provided between a wall of the base 10 and the engaging member 71, a positioning claw 711 of the engaging member 71 is pushed by the positioning spring 73 to engage in a positioning rack 45 of the first slide member 40; the push button 70 is provided on a hole 14 of the base 10, and a restoring spring is provided between the push button 70 and the cover 20; when the push button 70 is pressed, an inclined portion 701 on the push button 70 pushes an inclined surface 721 of the rotative arm 72, thus a protrusion 722 on the push button 70 pushes the positioning claw 711 of the engaging member 71 to move away from the positioning rack 45; when the push button 70 is released, a restoring spring 74 can push the push button 70 to its original position, the positioning claw 711 of the engaging member 71 can be pushed by the positioning spring 73 to again engage in a positioning rack 45; wherein the base 10 can further be pivotally provided with a first gear 15 which is engaged with a rack 55 of the second slide member 50, a pivot axle 16 of the first gear 15 can have damping oil; two positioning pins 41, 51 are integrally shaped, or are fixedly riveted or are locked respectively on the first slide member 40 and the second slide member 50; the two clamping arms 42, 52 are provided on their inner sides each with an elastic pad 46 and 56. And more, the base 10 and the cover 20 are pivotally provided each on one side thereof with a rotative support 17 and 18 respectively, for instance: the two rotative supports 17 and 18 are pivotally provided respectively on one side of the base 10 and the cover 20.

Figure 1:
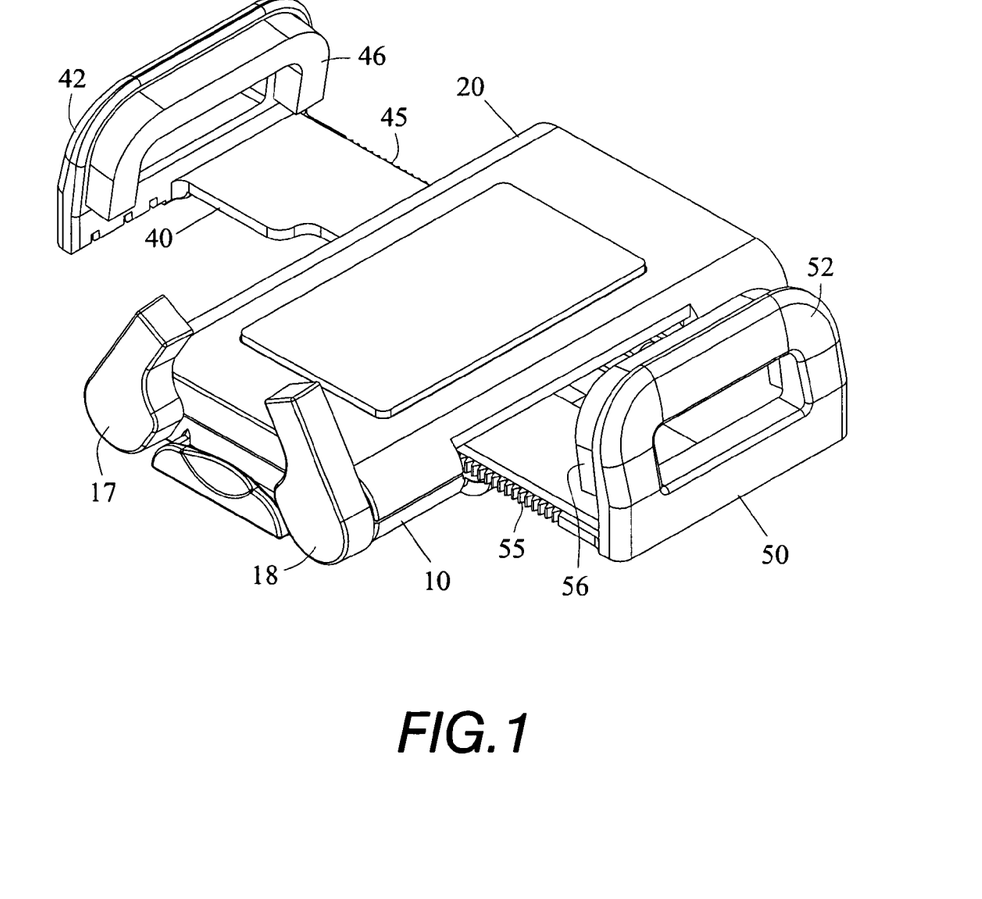
FIG. 1 is a perspective view of a preferred embodiment of the present invention.
Figure 2:
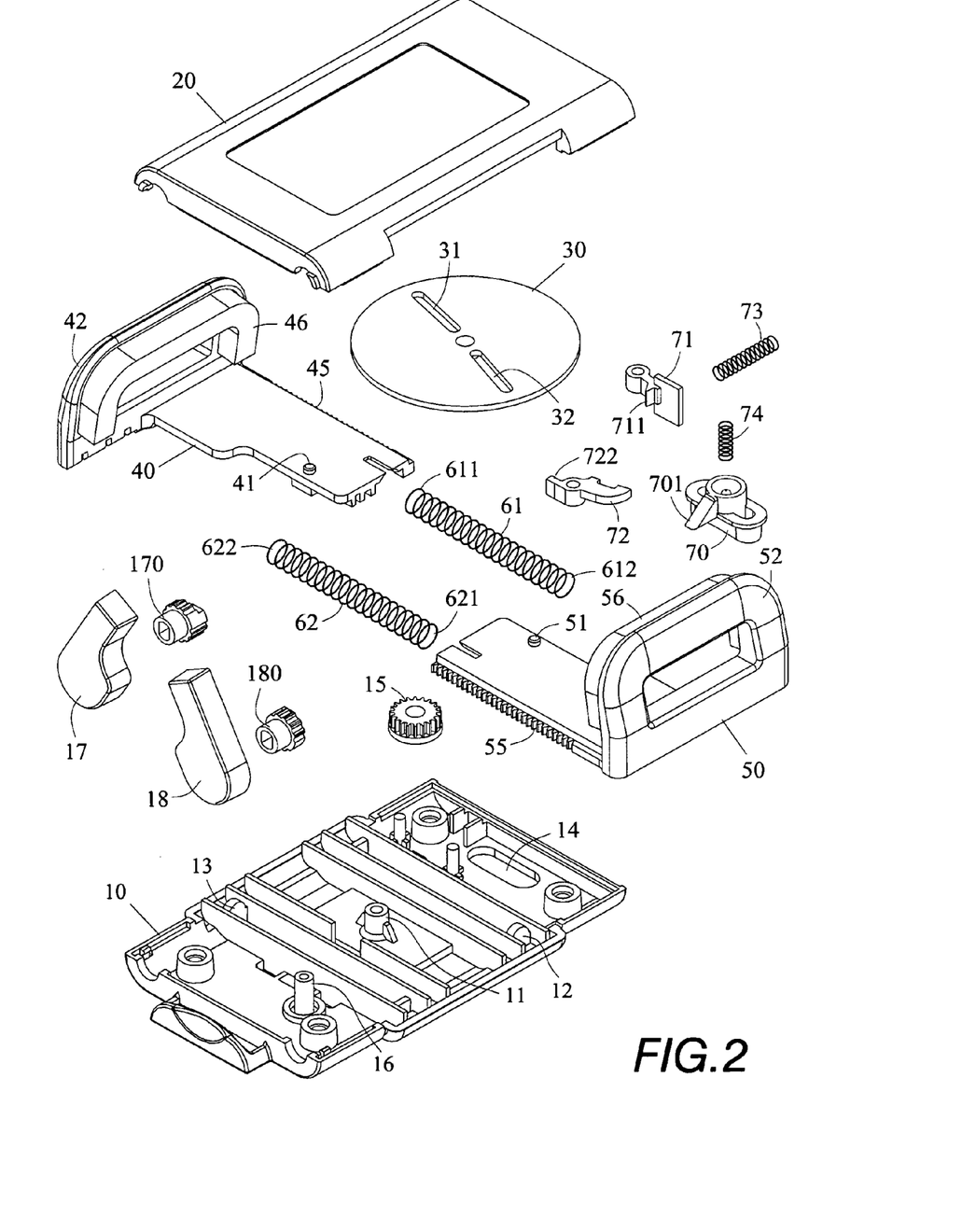
FIG. 2 is an anatomic perspective view of the preferred embodiment of the present invention.
Figure 3:
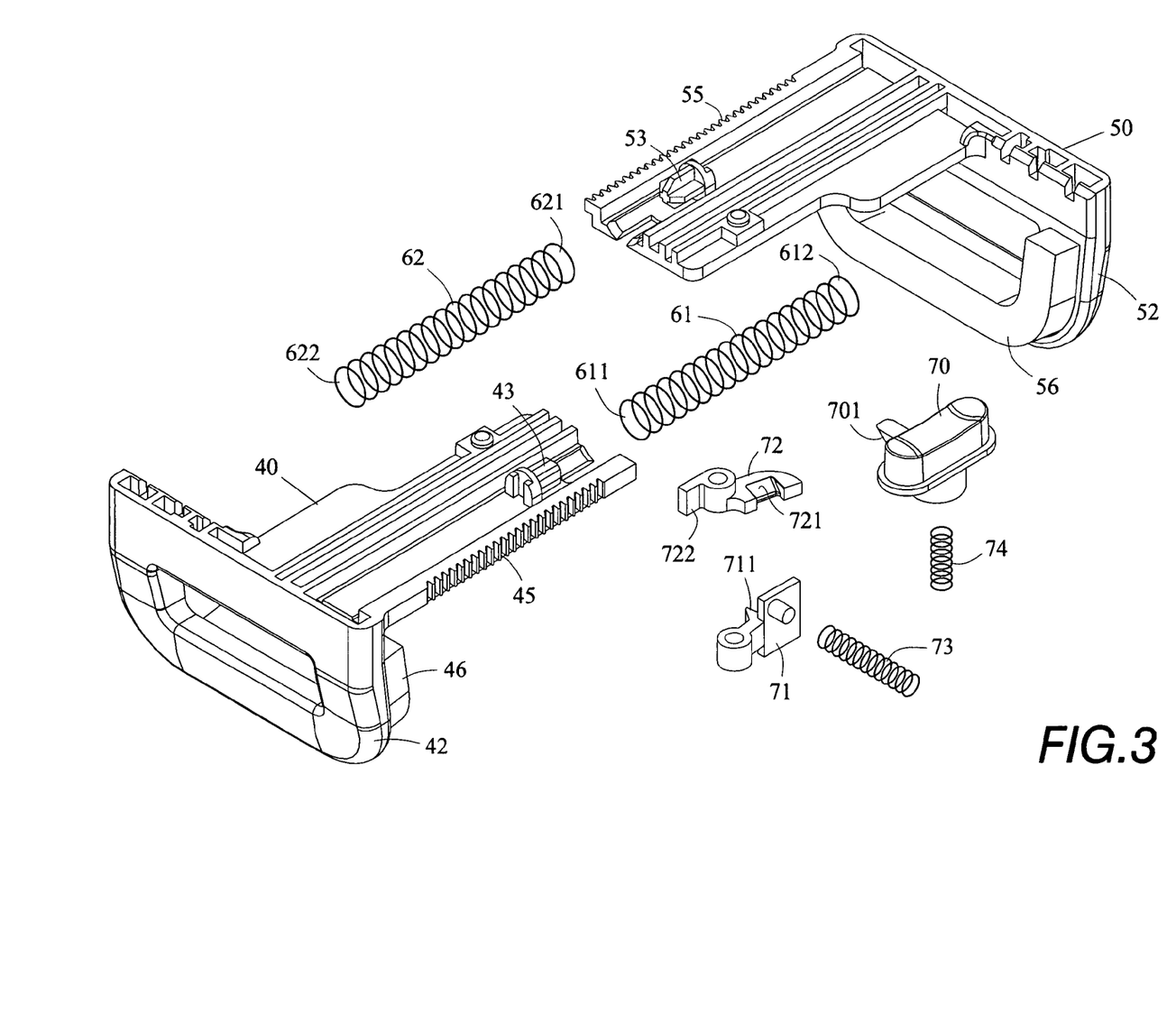
FIG. 3 is an anatomic perspective view of a part of the preferred embodiment of the present invention.
Figure 4:
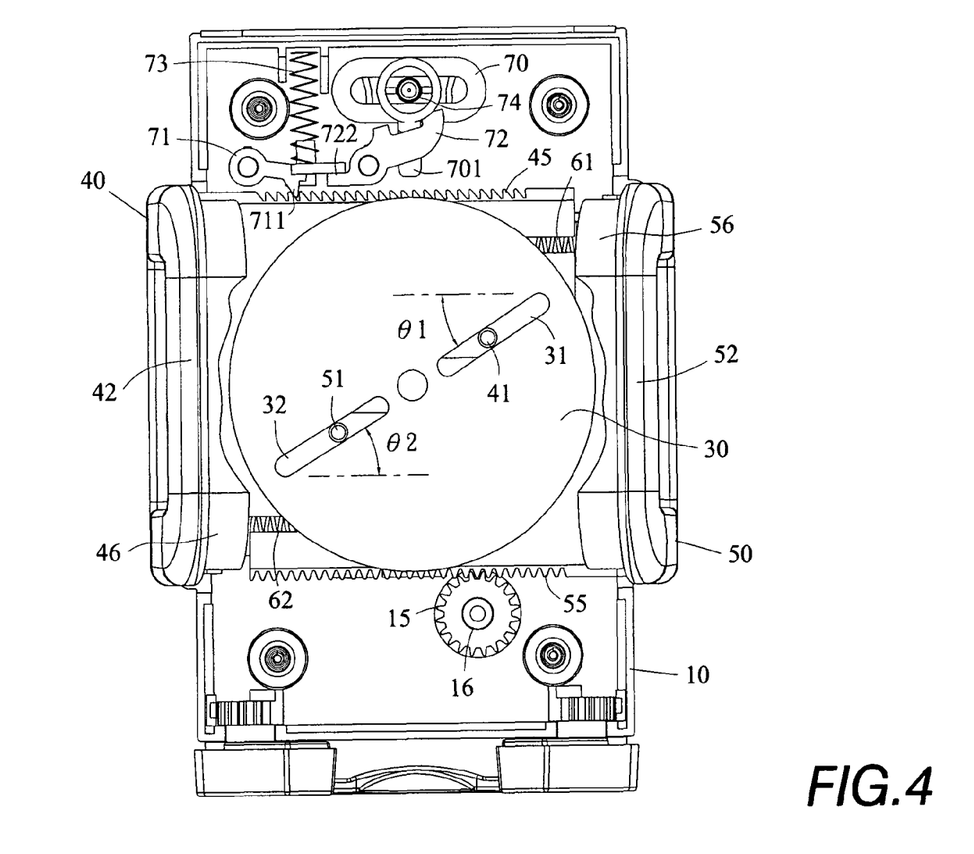
FIGS. 4 to 8 are schematic views showing actions of the present invention.

As shown in FIG. 4, the moving paths of the guiding slit 31 and the first slide member 40 form a deviation angle θ1, while the moving paths of the guiding slit 32 and the second slide member 50 form a deviation angle θ2; when the deviation angles θ1, θ2 of the two guide slits are both sharp angles, the first and the second slide members 40, 50 are at their initiate positions, and the main springs 61, 62 are each in a state of being compressed.

Figure 5:
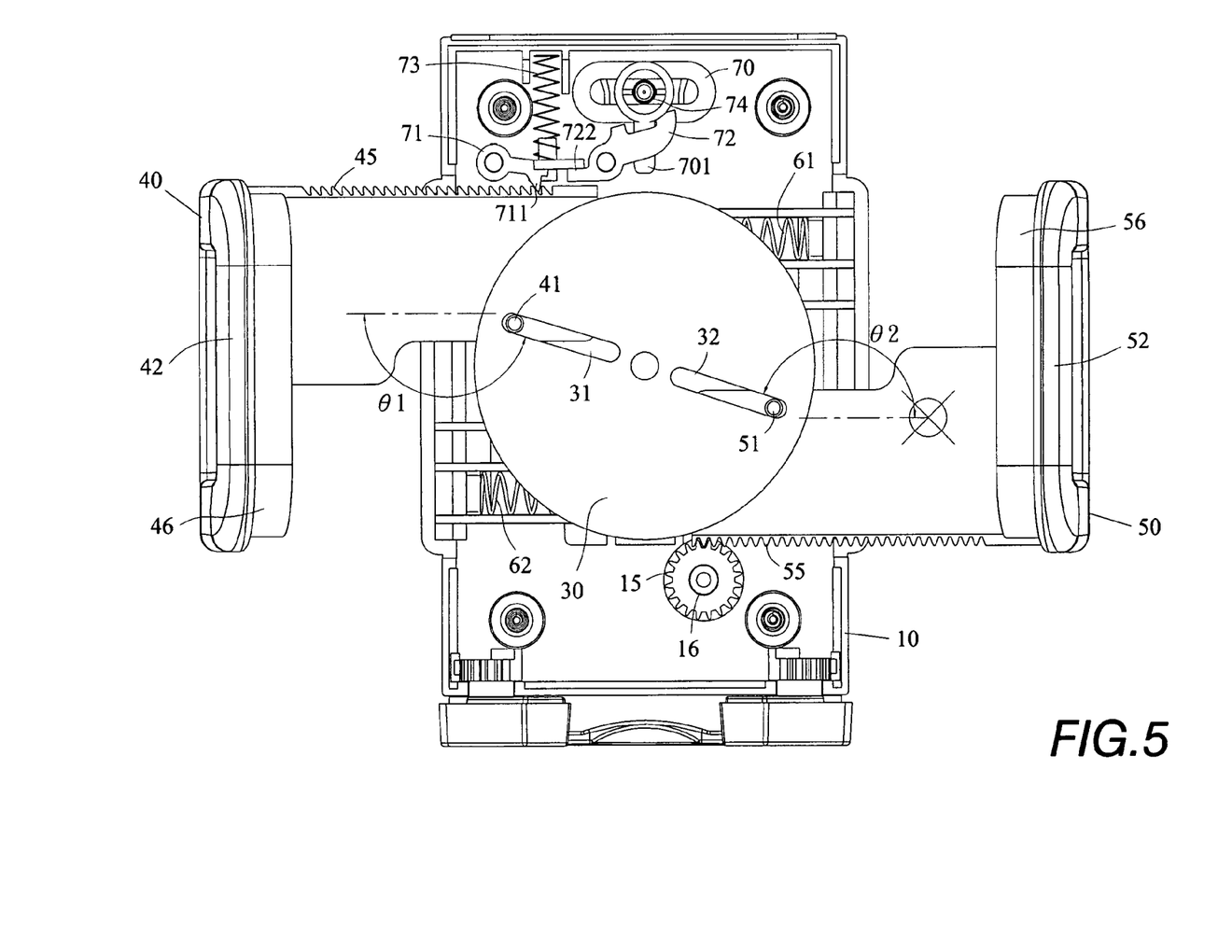

As shown in FIG. 5, when the push button 70 pushes the positioning claw 711 of the engaging member 71 to move away from the positioning rack 45; the main springs 61, 62 push the first and the second slide members 40, 50 to slide outwards to their extending positions, and the deviation angles θ1, θ2 gradually become obtuse angles. Further, during the process that the first and the second slide members 40, 50 slide outwards, the rack 55 of the second slide member 50 is engaged with the first gear 15, and by virtue that the pivot axle 16 of the first gear 15 has damping oil, the siding speeds of the first and the second slide members 40, 50 can be retarded. Moreover, engaging of the second slide member 50 with the first gear 15 can make the second slide member 50 more stable during to and fro sliding of the second slide member 50.

Figure 6:
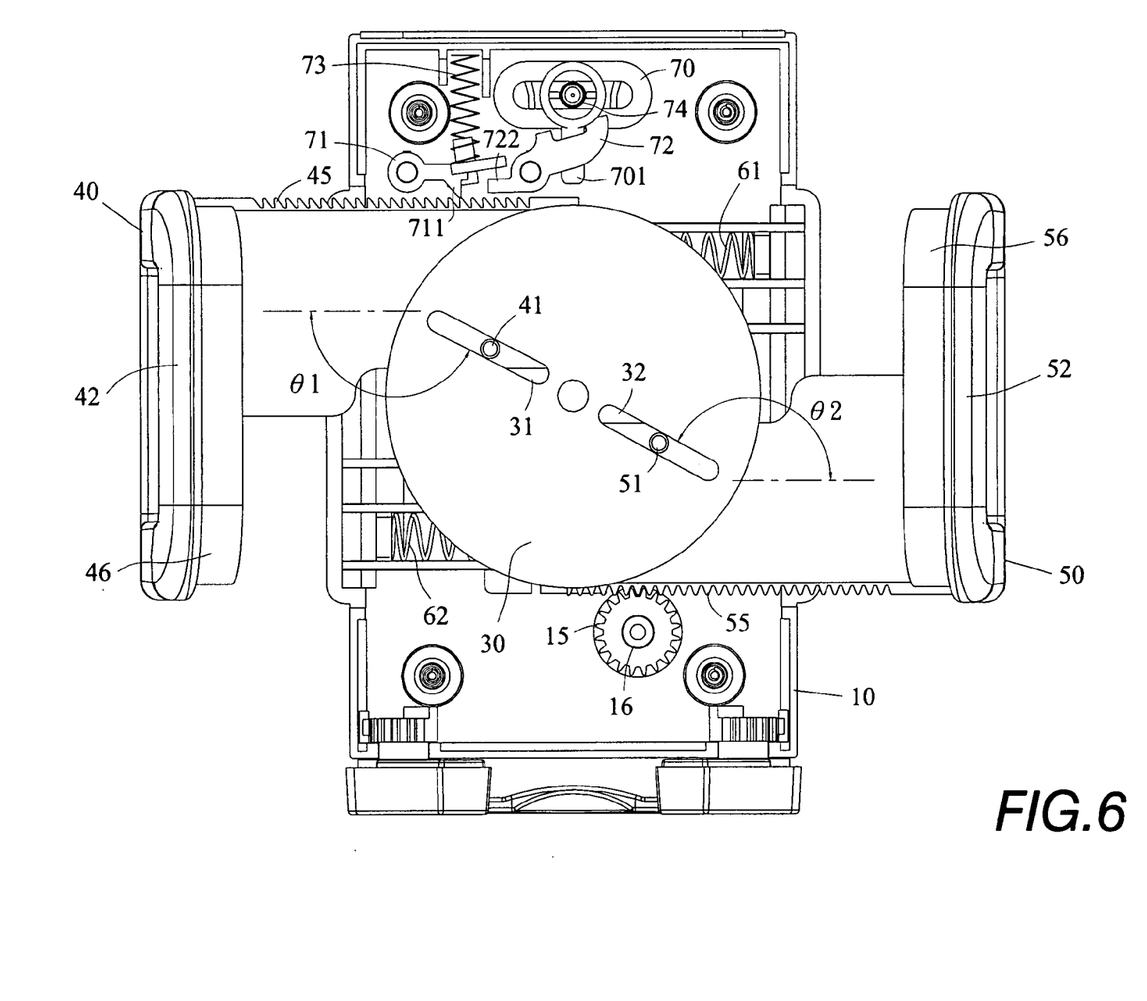
Figure 7:
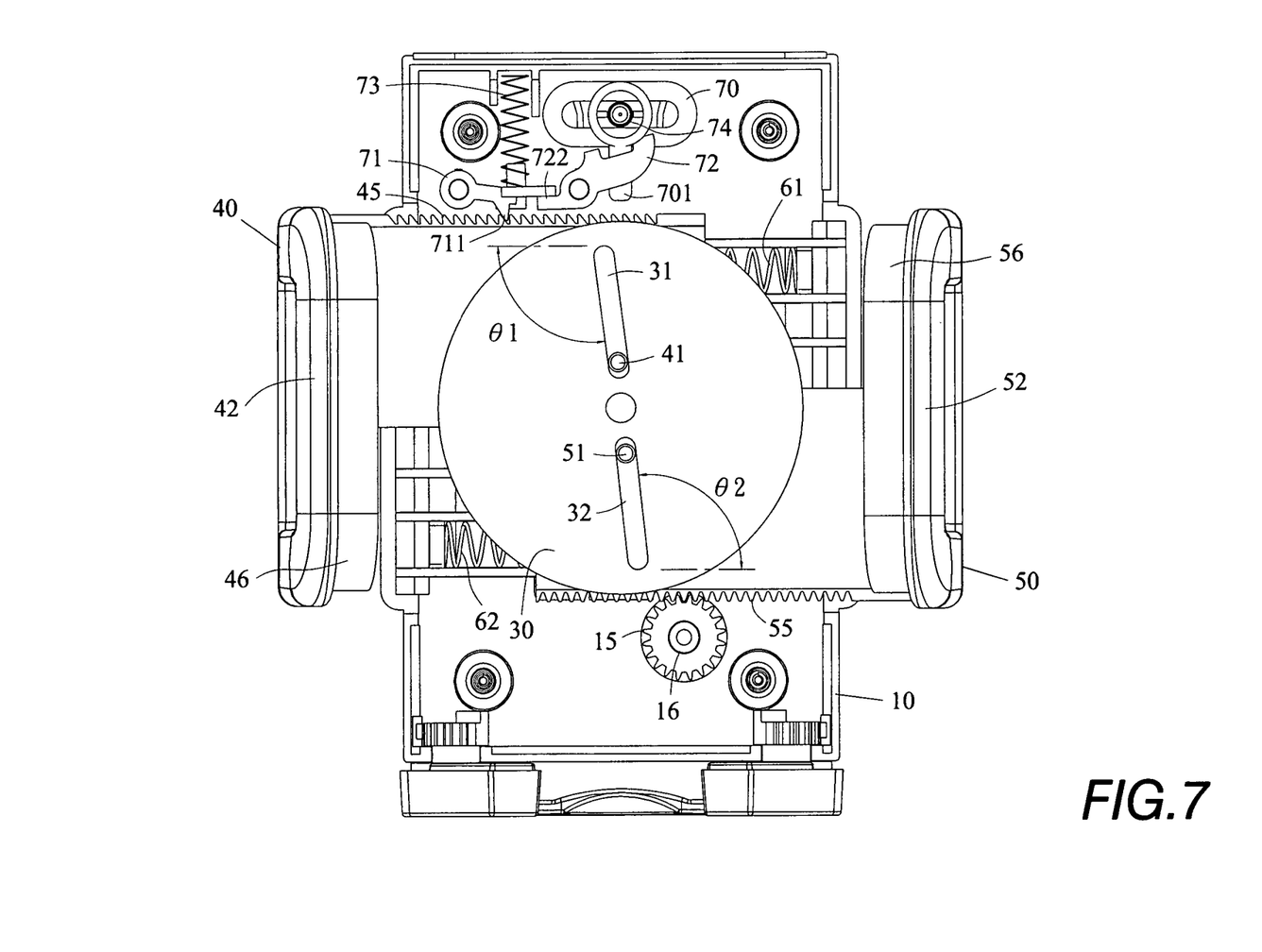

Referring to FIGS. 6 and 7, when the first and the second slide members 40, 50 restore from their extending positions, the deviation angles θ1, θ2 gradually become sharp angles from their obtuse angles, and the first slide member 40 can get the effect of one way positioning by means of the positioning rack 45 and the positioning claw 711 of the engaging member 71; that is, when the first slide member 40 slides inwards, a tooth of the positioning rack 45 can push away the positioning claw 711 of the engaging member 71, while the positioning spring 73 can push the positioning claw 711 of the engaging member 71 to engage the next tooth of the positioning rack 45 to get an effect of multi-stop positioning, the number of stops of the multi-stop positioning is decided by the number of teeth of the positioning rack 45.

Figure 8:
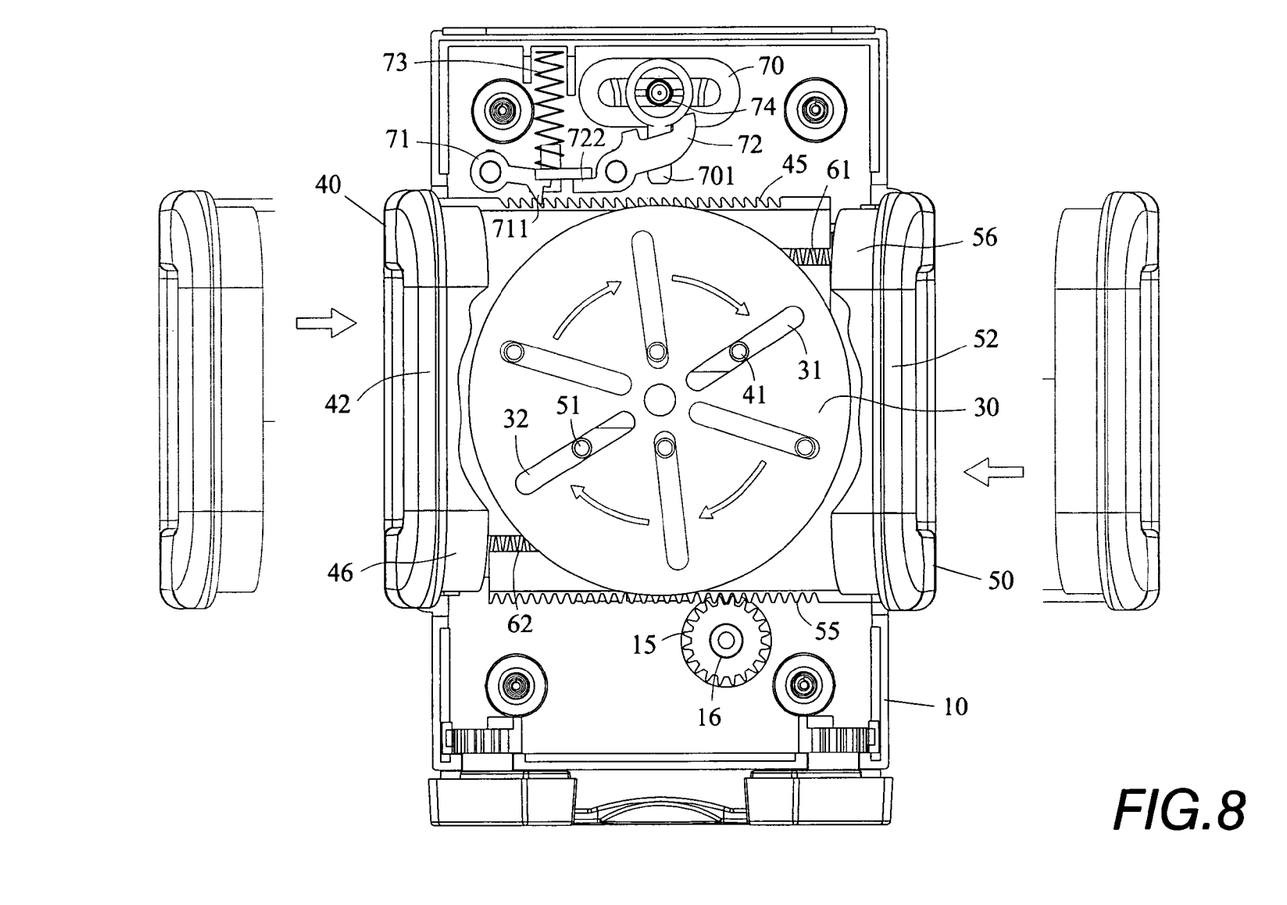

Referring to FIG. 8, during the process that the first and the second slide members 40, 50 slide to and fro, we can see from the rotation tracks of the two guiding slits 31, 32 and the moving tracks of the two positioning pins 41, 51 that: the strokes of moving to and fro of the first and the second slide members 40, 50 are larger than those of the link of the conventional clamping device.

Figure 9:
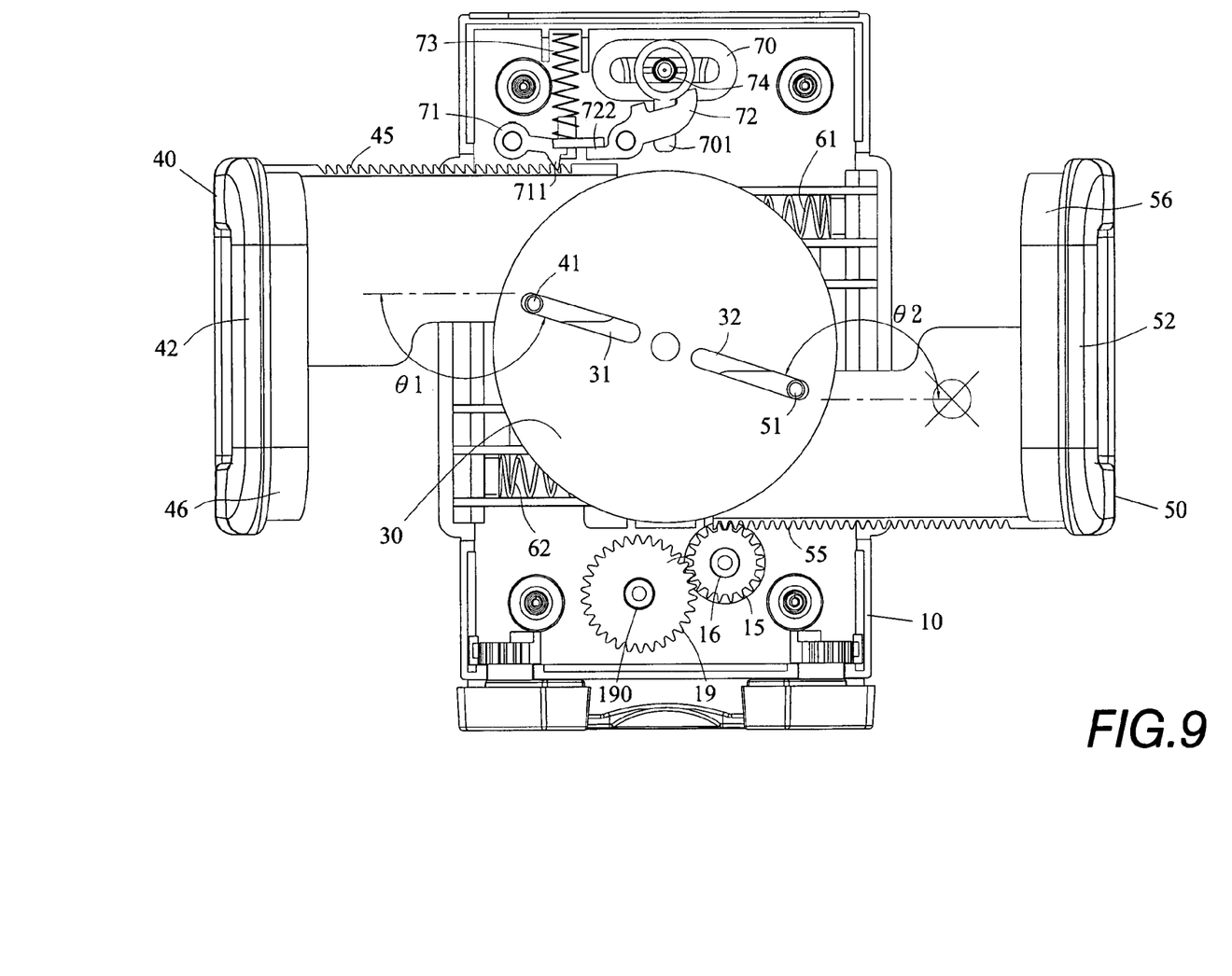
FIG. 9 is a schematic view showing practicing of a second embodiment of the present invention.

Referring to FIG. 9 showing a second embodiment of the present invention, wherein the base 10 is pivotally provided with a second gear 19 in engaging with the first gear 15, a pivot axle 190 of the second gear 19 has damping oil, the siding speeds of the first and the second slide members 40, 50 can thus be retarded, and the second slide member 50 will be more stable during its to and fro sliding.

Figure 10:
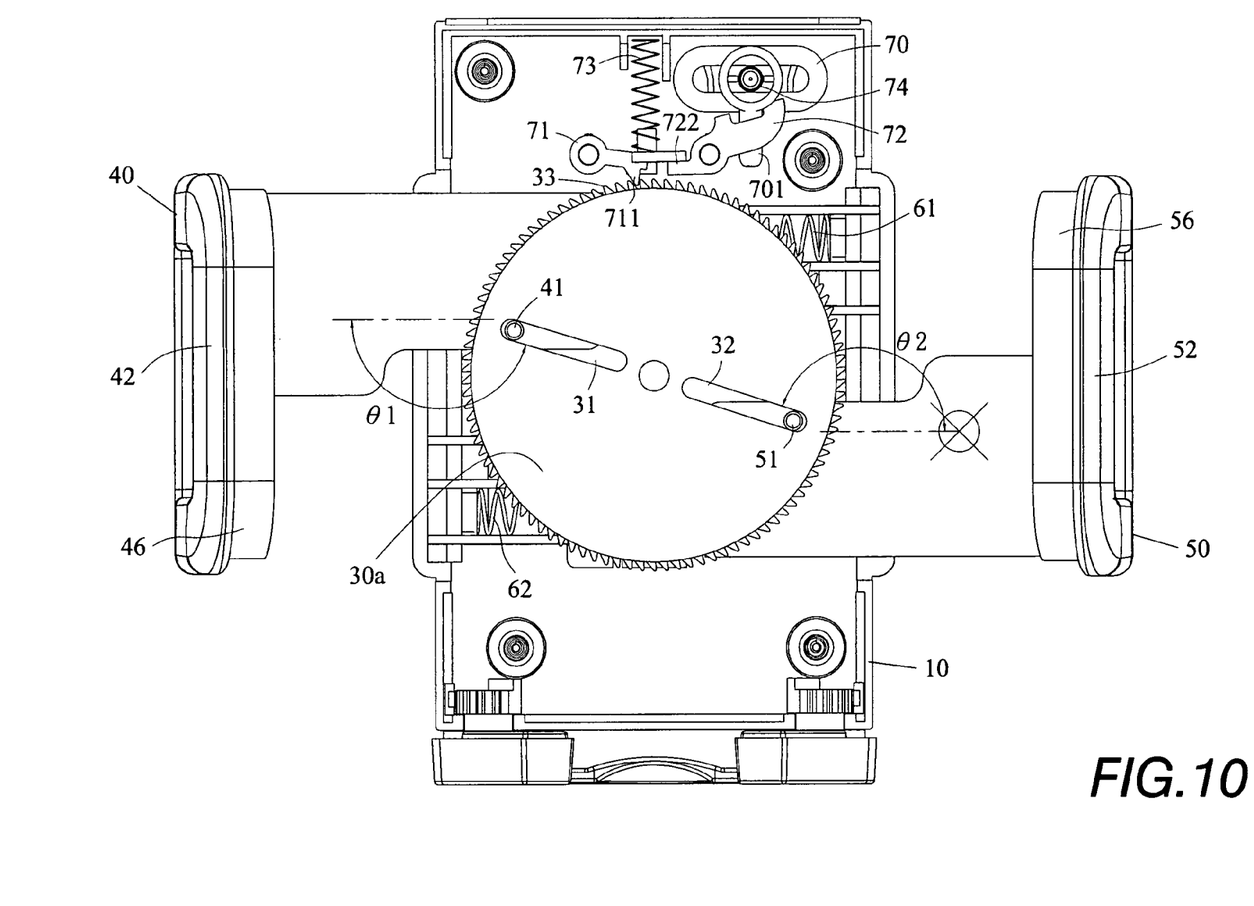
FIG. 10 is a schematic view showing practicing of a third embodiment of the present invention.

Referring to FIG. 10 showing a third embodiment of the present invention, wherein the structure of the clamping device is further simplified, a linking member 30a provide on the base 10 is circular which has two guiding slits 31, 32; a positioning pin 41 of the first slide member 40 is extended through the guiding slit 31, and a positioning pin 51 of the second slide member 50 is extended through the guiding slit 32, the linking member 30a is provided on and around its periphery with a set of positioning teeth 33, the positioning claw 711 of the engaging member 71 can be pushed by the positioning spring 73 to engage in the set of positioning teeth 33; the first slide member 40 and the second slide member 50 can get the effect of one way positioning by means of the set of positioning teeth 33 and the positioning claw 711 of the engaging member 71; that is, when the first slide member 40 and the second slide member 50 slide inwards for restoration from their extending positions, the linking member 30a rotates clockwise, one tooth of the set of positioning teeth 33 can push away the positioning claw 711 of the engaging member 71, while the positioning spring 73 can push the positioning claw 711 of the engaging member 71 to engage the next tooth of the set of positioning teeth 33 to get an effect of multi-stop positioning, the number of stops of the multi-stop positioning is decided by the number of teeth of the set of positioning teeth 33. And more, the linking member 30a is pivotally provided on the base 10 of which a pivot 11 (not shown) has damping oil, the siding speeds of the first and the second slide members 40, 50 can be retarded. Moreover, the first and the second slide members 40, 50 can have same structure and size to reduce number of dies required.

Figure 11:
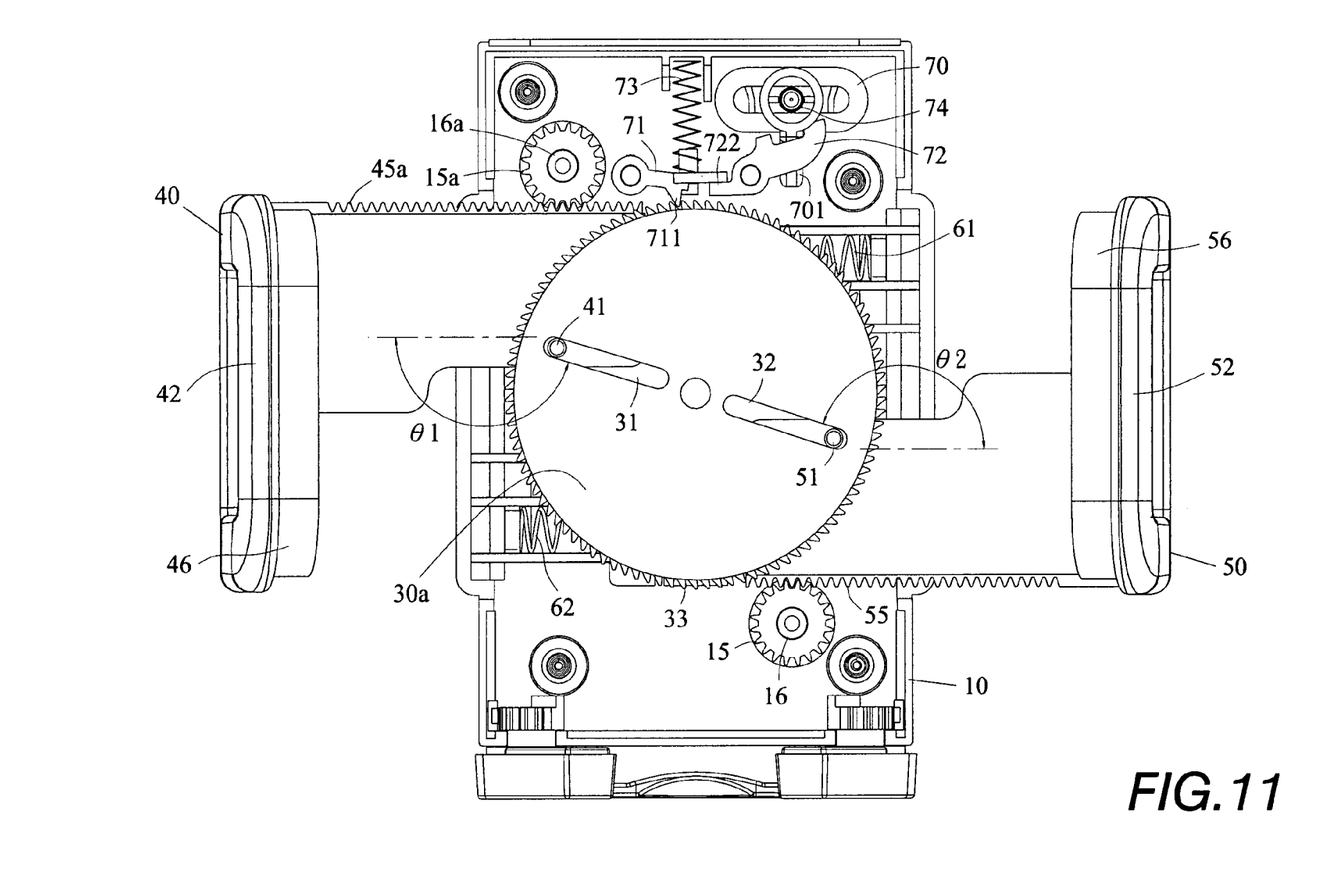
FIG. 11 is a schematic view showing practicing of a fourth embodiment of the present invention.

Referring to FIG. 11, wherein the structure of the third embodiment of the present invention is slightly varied to form a fourth embodiment; wherein the first and the second slide members 40, 50 can further be provided with racks 45a, 55, and the base 10 can further be provided with first gears 15, 15a, the rack 45a is engaged with the first gear 15a; pivot axles 16, 16a respectively of the first gears 15, 15a both have damping oil, hence the siding speeds of the first and the second slide members 40, 50 can be retarded. Moreover, engaging of the first gears 15, 15a with the racks 45a, 55 can make the first and the second slide members 40, 50 more stable during to and fro sliding of them. Similarly, the first and the second slide members 40, 50 can have same structure and size, and the first gears 15 and 15a can have same structure and size too, in order to reduce number of dies required.

In conclusion, the present invention surely can get the expected object thereof to provide a brand new clamping device with a linking member.

Having thus described the technical process of my invention having high industrial value, what I claim as new and desire to be secured by Letters Patent of the United States is:

1. A clamping device with a linking member comprising:
   a base that is combined with a cover;
   a linking member pivotally connected with said base and having two guide slits;
   a first and a second slide member provided between said base and said cover, two positioning pins of said slide members are extended through said two guiding slits of said linking member, said slide members both have clamping arms;
   a pair of main springs respectively provided between said base and corresponding ones of said slide members;
   an engaging member pivotally provided on said base, a positioning spring is provided to push a positioning claw of said engaging member to engage in a positioning rack of said first slide member;
   a first gear pivotally provided on said base, and is engaged with a rack of said second slide member;
   a push button provided on said base, and having a restoring spring; wherein when deviation angles of said two guide slits are sharp angles, said first and said second slide members are at their initiate positions, then said main springs are each in a state of being compressed; and when said push button moves away said positioning claw of said engaging member from said positioning rack, said main springs pushes said first and said second slide members to slide outwards to their extending positions, and deviation angles of said two guide slits become obtuse angles; when said first and the second slide members restore their original inside positions, said positioning spring pushes said positioning claw of said engaging member to engage in said positioning rack for positioning.

2. The clamping device with a linking member as claimed in claim 1, wherein a pivot axle of said first gear has damping oil.

3. The clamping device with a linking member as claimed in claim 1, wherein said base is pivotally provided with a second gear in engaging with said first gear, a pivot axle of said second gear has damping oil.

4. The clamping device with a linking member as claimed in claim 1, wherein a rotative arm is pivotally provided on said base, when said push button is pressed, an inclined portion on said push button pushes an inclined surface of said rotative arm, thus a protrusion on said push button pushes said positioning claw of said engaging member to move away from said positioning rack.

5. The clamping device with a linking member as claimed in claim 1, wherein said positioning pins are integrally shaped, or are fixedly riveted or are locked respectively on said first slide member and said second slide member.

6. The clamping device with a linking member as claimed in claim 1, wherein said clamping arms of said first and said second slide members are provided on their inner sides each with an elastic pad.

7. The clamping device with a linking member as claimed in claim 1, wherein said base and said cover are pivotally provided each on one side thereof with a pair of rotative supports.

8. A clamping device with a linking member comprising:
   a base that is combined with a cover;
   a linking member pivotally connected with said base and having two guide slits;
   a first and a second slide member provided between said base and said cover, two positioning pins of said slide members are extended through said two guiding slits of said linking member, said slide members both have clamping arms;
   a pair of main springs respectively provided between said base and corresponding ones of said slide members;
   an engaging member pivotally provided on said base, a positioning spring is provided to push a positioning claw of said engaging member to engage in a positioning rack of said first slide member;

a push button provided on said base, and having a restoring spring; wherein when deviation angles of said two guide slits are sharp angles, said first and said second slide members are at their initiate positions, then said main springs are each in a state of being compressed; and when said push button moves away said positioning claw of said engaging member from said positioning rack, said main springs pushes said first and said second slide members to slide outwards to their extending positions, and deviation angles of said two guide slits become obtuse angles; when said first and the second slide members restore their original inside positions, said positioning spring pushes said positioning claw of said engaging member to engage in said positioning rack for positioning.

9. The clamping device with a linking member as claimed in claim 8, wherein said base is pivotally provided with a first gear being engaged with a rack of said second slide member, a pivot axle of said first gear has damping oil.

10. The clamping device with a linking member as claimed in claim 8, wherein said positioning pins are integrally shaped, or are fixedly riveted or are locked respectively on said first slide member and said second slide member.

11. A clamping device with a linking member comprising:
a base that is combined with a cover;
a circular linking member pivotally connected with said base and having two guide slits, said circular linking member is provided on and around its periphery with a set of positioning teeth;
a first and a second slide member provided between said base and said cover, two positioning pins of said slide members are extended through said two guiding slits of said linking member, said slide members both have clamping arms;
a pair of main springs respectively provided between said base and corresponding ones of said slide members;
an engaging member pivotally provided on said base, a positioning spring is provided to push a positioning claw of said engaging member to engage in said set of positioning teeth of said circular linking member;
a push button provided on said base, and having a restoring spring; wherein when deviation angles of said two guide slits are sharp angles, said first and said second slide members are at their initiate positions, then said main springs are each in a state of being compressed; and when said push button moves away said positioning claw of said engaging member from said positioning rack, said main springs pushes said first and said second slide members to slide outwards to their extending positions, and deviation angles of said two guide slits become obtuse angles; when said first and the second slide members restore their original inside positions, said positioning spring pushes said positioning claw of said engaging member to engage in said set of positioning teeth for positioning.

12. The clamping device with a linking member as claimed in claim 11, wherein said circular linking member is pivotally provided on said base of which a pivot has damping oil.

13. The clamping device with a linking member as claimed in claim 11, wherein said base is pivotally provided with a first gear being engaged with a rack of said second slide member, a pivot axle of said first gear has damping oil.

14. The clamping device with a linking member as claimed in claim 11, wherein said base is provided with two first gears, one of said first gear is engaged with said first slide member, while other one is engaged with said second slide member; pivot axles respectively of said first gears both have damping oil.

15. The clamping device with a linking member as claimed in claim 11, wherein said positioning pins are integrally shaped, or are fixedly riveted or are locked respectively on said first slide member and said second slide member.

16. The clamping device with a linking member as claimed in claim 11, wherein a rotative arm is pivotally provided on said base, when said push button is pressed, an inclined portion on said push button pushes an inclined surface of said rotative arm, thus a protrusion on said push button pushes said positioning claw of said engaging member to move away from said positioning rack.

17. The clamping device with a linking member as claimed in claim 11, wherein said clamping arms of said first and said second slide members are provided on their inner sides each with an elastic pad; said base is pivotally provided on one side thereof with a pair of rotative supports.

* * * * *